United States Patent
Liu et al.

(10) Patent No.: US 9,710,946 B2
(45) Date of Patent: Jul. 18, 2017

(54) METHOD AND APPARATUS FOR DISPLAYING POINT OF INTEREST

(71) Applicant: Baidu Online Network Technology (Beijing) Co., Ltd, Beijing (CN)

(72) Inventors: Pu Liu, Beijing (CN); Yongqiang Li, Beijing (CN); Sunrong Yan, Beijing (CN)

(73) Assignee: BAIDU ONLINE NETWORK TECHNOLOGY (BEIJING) CO., LTD, Beijing (CN)

( * ) Notice: Subject to any disclaimer, the term of this patent is extended or adjusted under 35 U.S.C. 154(b) by 92 days.

(21) Appl. No.: 14/587,660

(22) Filed: Dec. 31, 2014

(65) Prior Publication Data

US 2016/0019704 A1    Jan. 21, 2016

(30) Foreign Application Priority Data

Jul. 17, 2014  (CN) .......................... 2014 1 0340025

(51) Int. Cl.
*G09G 5/00* (2006.01)
*G06T 11/60* (2006.01)
(Continued)

(52) U.S. Cl.
CPC .............. *G06T 11/60* (2013.01); *G01C 21/32* (2013.01); *G01C 21/3602* (2013.01);
(Continued)

(58) Field of Classification Search
CPC ................................ G06T 11/60; G06T 19/00
(Continued)

(56) References Cited

U.S. PATENT DOCUMENTS 6,748,225 B1 *  6/2004  Kepler ................. G01C 21/005
                                                                455/456.1
8,131,118 B1      3/2012  Jing et al.
(Continued)

FOREIGN PATENT DOCUMENTS

CN    102119402 A    7/2011
JP    2002-183150 A  6/2002
(Continued)

OTHER PUBLICATIONS

EP, Extended European Search Report, EP Application No. 14200674.1, Nov. 30, 2015.
(Continued)

*Primary Examiner* — Jin Ge
(74) *Attorney, Agent, or Firm* — Orrick, Herrington & Sutcliffe, LLP (57) ABSTRACT

A method and apparatus for displaying a point of interest. In the embodiments of the present invention, by means of acquiring a location of a target object and then determining a visible point of interest at the location as a target point of interest, the target point of interest can be displayed. Since an invisible point of interest which cannot be seen at the location of the target object is no longer displayed, but a visible point of interest which can be seen at the location of the target object is displayed, the displayed point of interest can essentially satisfy the true locating intention of a user. Therefore, the problem in the prior art of the increase in data interaction between an application and a query engine caused by the user repeatedly querying via the application can be avoided, thereby reducing the processing burden of the query engine.

18 Claims, 3 Drawing Sheets

(51) Int. Cl.
*G01C 21/36* (2006.01)
*G06K 9/20* (2006.01)
*G06K 9/32* (2006.01)
*G06K 9/00* (2006.01)
*G01C 21/32* (2006.01)

(52) U.S. Cl.
CPC ....... *G06K 9/00664* (2013.01); *G06K 9/2054* (2013.01); *G06K 9/3258* (2013.01); *G06K 2209/01* (2013.01); *G06T 2215/16* (2013.01)

(58) Field of Classification Search
USPC .......................................................... 345/619
See application file for complete search history.

(56) References Cited

U.S. PATENT DOCUMENTS

| | | | |
|---|---|---|---|
| 8,688,377 B1* | 4/2014 | Urbach | G01C 21/32 701/400 |
| 2002/0120397 A1 | 8/2002 | Kepler | |
| 2003/0176965 A1* | 9/2003 | Padmanabhan | G01C 21/20 701/408 |
| 2005/0123200 A1* | 6/2005 | Myers | G06K 9/3258 382/182 |
| 2007/0140595 A1 | 6/2007 | Taylor et al. | |
| 2010/0250126 A1 | 9/2010 | Epshtein et al. | |
| 2011/0102580 A1* | 5/2011 | Langdon | G06T 7/0044 348/135 |
| 2011/0178697 A1* | 7/2011 | Mincey | G01C 21/3644 701/532 |
| 2012/0016586 A1* | 1/2012 | Epshtein | G01C 21/3602 701/527 |
| 2012/0105475 A1 | 5/2012 | Tseng | |
| 2014/0063055 A1* | 3/2014 | Osterhout | G06F 3/005 345/633 |

FOREIGN PATENT DOCUMENTS

| | | |
|---|---|---|
| JP | 2007-240198 A | 9/2007 |
| JP | 2009-133657 A | 6/2009 |
| JP | 2010-191813 A | 9/2010 |
| WO | WO 2013/134958 A1 | 9/2013 |

OTHER PUBLICATIONS

CN, Second Office Action, Chinese Patent Application No. 201410340025, Apr. 16, 2017.

* cited by examiner

Fig. 8

METHOD AND APPARATUS FOR DISPLAYING POINT OF INTEREST

CROSS-REFERENCE TO RELATED APPLICATIONS

The present application claims priority to Chinese Patent Application No. CN201410340025.6, filed on Jul. 17, 2014, the entire disclosure of which is incorporated herein by reference in its entirety and for all purposes.

TECHNICAL FIELD

The present invention relates to location based service (LBS) technology, and in particular, to a method and apparatus for displaying a point of interest (POI).

BACKGROUND

With the development of communication technologies, a terminal integrates more and more functions, so that a system function list of the terminal includes more and more corresponding applications (APP). Some of the applications may relate to some location based services (LBS), also referred to as location services, such as Baidu map. In LBS, a server-side corresponding to the application stores a large amount of point of interest (POI) data so as to provide a query result based on an LBS query for the application, i.e., a client-side. The point of interest data may include several aspects of information such as name information, category information and geographical location information (i.e., longitudes and latitudes, etc.).

However, in some cases, a user traveling on a real road cannot observe the real location of the point of interest displayed by the terminal, for example, cases where other points of interest collected by an operator who has entered the interior of a point of interest cannot be observed by the user traveling on the real road, such that the point of interest displayed by the terminal cannot satisfy the true locating intention of the user and the user needs to carry out a locating operation repeatedly via the application, and thus, data interaction between the application and a query engine may be increased, resulting in an increase in the processing burden of the query engine.

SUMMARY

A method and apparatus for displaying a point of interest (POI) are provided in a plurality of aspects of the present invention, so as to reduce the processing burden of a query engine.

A method for displaying a point of interest is provided in one aspect of the present invention, comprising:
acquiring a location of a target object;
determining a visible point of interest at the location as a target point of interest; and
displaying the target point of interest.

The aspect as mentioned above and any possible implementation further provide an implementation, wherein prior to the step of determining a visible point of interest at the location as a target point of interest, the method further comprises:
acquiring a street view image to be processed;
performing recognition processing on the street view image to acquire a recognition result, with the recognition result comprising text information about the street view image; and
selecting a candidate point of interest matching the text information as a visible point of interest.

The aspect as mentioned above and any possible implementation further provide an implementation, wherein the step of selecting a candidate point of interest matching the text information as a visible point of interest comprises:
acquiring the degree of similarity between the text information and candidate points of interest to be matched; and
selecting some candidate points of interest as visible points of interest according to the degree of similarity.

The aspect as mentioned above and any possible implementation further provide an implementation, wherein after the step of selecting a candidate point of interest matching the text information as a visible point of interest, the method further comprises:
acquiring geographical location information about a collection site of a street view image to which the text information matching the visible point of interest belongs;
acquiring an azimuth angle from the collection site of the street view image to which the text information matching the visible point of interest belongs to the visible point of interest;
acquiring calculated geographical location information about the visible point of interest according to the geographical location information about the collection site and the azimuth angle; and
verifying the visible point of interest according to the calculated geographical location information about the visible point of interest and standard geographical location information about the visible point of interest.

The aspect as mentioned above and any possible implementation further provide an implementation, wherein the step of displaying the target point of interest comprises:
displaying the target point of interest by way of at least one of map labeling, an image and text.

An apparatus for displaying a point of interest is provided in another aspect of the present invention, comprising:
an acquisition unit for acquiring a location of a target object;
a determination unit for determining a visible point of interest at the location as a target point of interest; and
a display unit for displaying the target point of interest.

The aspect as mentioned above and any possible implementation further provide an implementation, wherein the apparatus further comprises an association unit for
acquiring a street view image to be processed;
performing recognition processing on the street view image to acquire a recognition result, with the recognition result comprising text information about the street view image; and
selecting a candidate point of interest matching the text information as a visible point of interest.

The aspect as mentioned above and any possible implementation further provide an implementation, wherein the association unit is specifically used for
acquiring the degree of similarity between the text information and a candidate points of interest to be matched; and
selecting some candidate points of interest as visible points of interest according to the degree of similarity.

The aspect as mentioned above and any possible implementation further provide an implementation, and the apparatus further comprises a verification unit for
acquiring geographical location information about a collection site of a street view image to which the text information matching the visible point of interest belongs;

acquiring an azimuth angle from the collection site of the street view image to which the text information matching the visible point of interest belongs to the visible point of interest;

acquiring calculated geographical location information about the visible point of interest according to the geographical location information about the collection site and the azimuth angle; and verifying the visible point of interest according to the calculated geographical location information about the visible point of interest and standard geographical location information about the visible point of interest.

The aspect as mentioned above and any possible implementation further provide an implementation, wherein the display unit is specifically used for displaying the target point of interest by way of at least one of map labeling, an image and text.

It can be seen from the above-mentioned technical solutions that in the embodiments of the present invention, by means of acquiring a location of a target object and then determining a visible point of interest at the location as a target point of interest, the target point of interest can be displayed. Since an invisible point of interest which cannot be seen at the location of the target object is no longer displayed, but a visible point of interest which can be seen at the location of the target object is displayed, the displayed point of interest can essentially satisfy the true locating intention of a user. Therefore, the problem in the prior art of the increase in data interaction between an application and a query engine caused by the user repeatedly querying via the application can be avoided, thereby reducing the processing burden of the query engine.

In addition, by using the technical solutions provided in the present invention, since an invisible point of interest which cannot be seen at the location of the target object is no longer displayed, but a visible point of interest which can be seen at the location of the target object is displayed, the displayed point of interest can essentially satisfy the true locating intention of the user and the validity of the locating result can be effectively improved.

In addition, by using the technical solutions provided in the present invention, since an invisible point of interest which cannot be seen at the location of the target object is no longer displayed, but a visible point of interest which can be seen at the location of the target object is displayed, the displayed point of interest can essentially satisfy the true locating intention of the user and the efficiency of location can be effectively improved.

BRIEF DESCRIPTION OF THE ACCOMPANYING DRAWINGS

In order to illustrate the technical solutions in the embodiments of the present invention more clearly, the accompanying drawings required to be used in the description of the embodiments or the prior art are briefly introduced below. Obviously, the accompanying drawings in the following description are some embodiments of the present invention, and those of ordinary skill in the art may further obtain other drawings according to these accompanying drawings without making inventive efforts.

DETAILED DESCRIPTION OF PREFERRED EMBODIMENTS

In order to make the objectives, technical solutions and advantages of the embodiments of the present invention more clear, the technical solutions in the embodiments of the present invention will be described clearly and completely below in combination with the accompanying drawings in the embodiments of the present invention. Obviously, the described embodiments are a part of the embodiments of the present invention rather than all the embodiments. All other embodiments obtained by those of ordinary skill in the art based on the embodiments in the present invention without making inventive efforts are within the scope of protection of the present invention.

It must be explained that the terminals involved in the embodiments of the present invention may comprise but are not limited to a mobile phone, a personal digital assistant (PDA), a wireless handheld apparatus, a wireless netbook, a personal computer, a portable computer, a tablet computer, an MP3 player, an MP4 player, a wearable device (such as smart glasses, a smartwatch and a smartband), etc.

In addition, the term "and/or" herein is merely an association relationship describing associated objects, and indicates that three relationships may exist, for example, A and/or B may represent: three cases where A exists alone, A and B exist simultaneously, and B exists alone. In addition, the character "/" herein generally indicates an "'or" relationship between associated objects.

Figure 1:
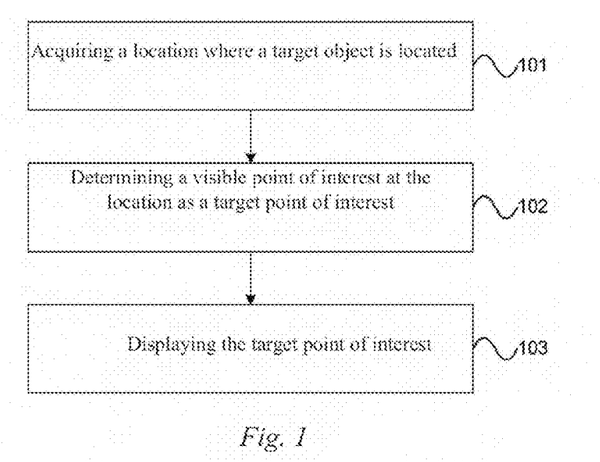
FIG. 1 is a schematic flowchart of a method for displaying a point of interest provided in an embodiment of the present invention.

FIG. 1 is a schematic flowchart of a method for displaying a point of interest provided in an embodiment of the present invention, as shown in FIG. 1.

101. A location of a target object is acquired.

102. A visible point of interest at the location is determined as a target point of interest.

103. The target point of interest is displayed.

It must be explained that the execution body of 101-103 may be an application located in a local terminal, or may also be a functional unit such as a plug-in or a software development kit (SDK) arranged in the application located in the local terminal, or may also be a query engine located in a network-side server; this embodiment imposes no particular limitations in this respect.

It can be understood that the application may be an application program (nativeAPP) installed on a terminal, or may also be a webpage program (webAPP) of a browser on the terminal; this embodiment imposes no limitations in this respect.

Thus, by means of acquiring a location of a target object and then determining a visible point of interest at the location as a target point of interest, the target point of interest can be displayed. Since an invisible point of interest which cannot be seen at the location of the target object is no longer displayed, but a visible point of interest which can be seen at the location of the target object is displayed, the displayed point of interest can essentially satisfy the true locating intention of a user. Therefore, the problem in the prior art of the increase data interaction between an application and a query engine caused by the user repeatedly querying via the application can be avoided, thereby reducing the processing burden of the query engine.

Optionally, in a possible implementation of this embodiment, in 101, various existing location technologies may specifically be used to acquire a locating result of the target object, i.e., geographical location information about the location of the target object; this embodiment imposes no limitations in this respect. For example, location technologies such as global positioning system (GPS) technology, wireless fidelity (Wi-Fi) location technology or base station location technology.

Optionally, in a possible implementation of this embodiment, before 102, a street view image to be processed may further be acquired and then recognition processing is performed on the street view image to acquire a recognition result, with the recognition result comprising text information about the street view image. Then, a candidate point of interest matching the text information may be selected as a visible point of interest.

Specifically, optical character recognition (OCR) processing may be specifically performed on the street view image to acquire a recognition result, with the recognition result comprising the text information about the street view image. Reference may specifically be made to relevant content in the prior art for a detailed description of OCR processing, which will not be described here.

Figure 2:
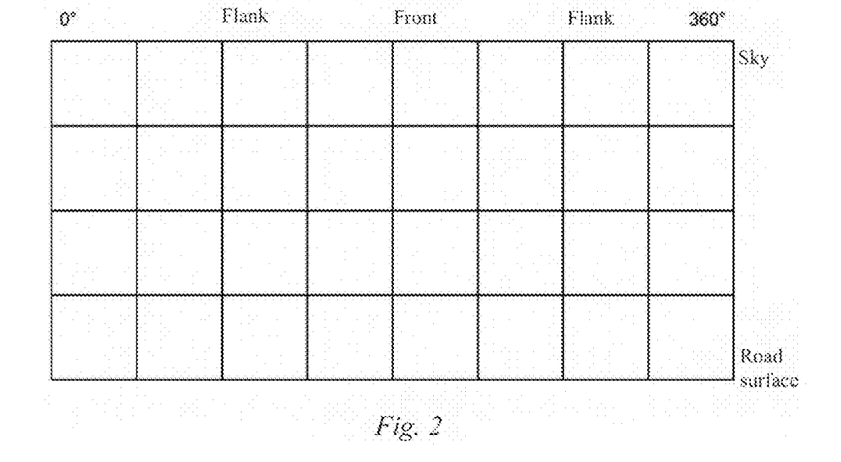
FIG. 2 is an area construction schematic diagram of a street view image in an embodiment corresponding to FIG. 1.

Generally, the street view image is an image of a real road and entities at both sides of the real road which is taken in the process of a collection vehicle traveling along the real road, and is a 360-degree panoramic image, and the street view image at each collection site usually can be composed of 4×8 (32) pictures equivalently, as shown in FIG. 2.

In this embodiment, in order to avoid unnecessary invalid recognition, a recognition area to be recognized may be specifically determined according to the location of the text information to be acquired.

Figure 3:
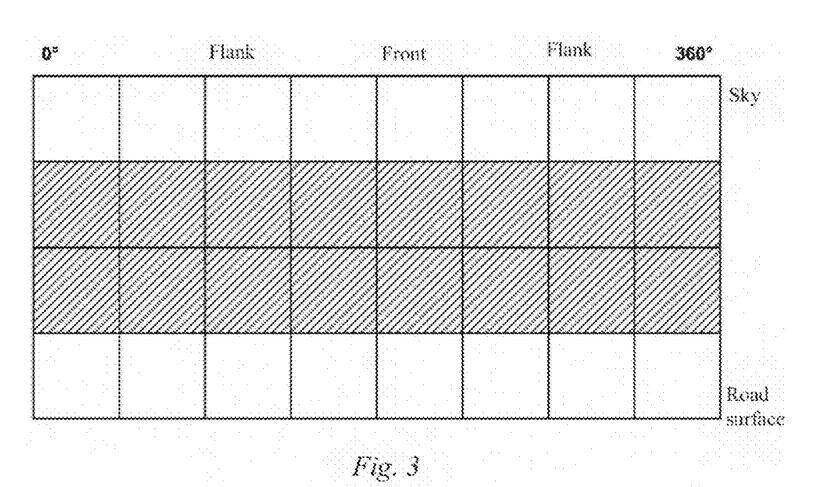
FIG. 3 is a recognition area schematic diagram of a street view image in an embodiment corresponding to FIG. 1.

For example, if the text information to be acquired is words on a signboard of a shop, since the signboard of the shop is usually horizontally arranged at a location at a certain height from the road surface, or is vertically arranged at a location close to the road surface, only the shaded area in FIG. 3 needs to be recognized.

Figure 8:
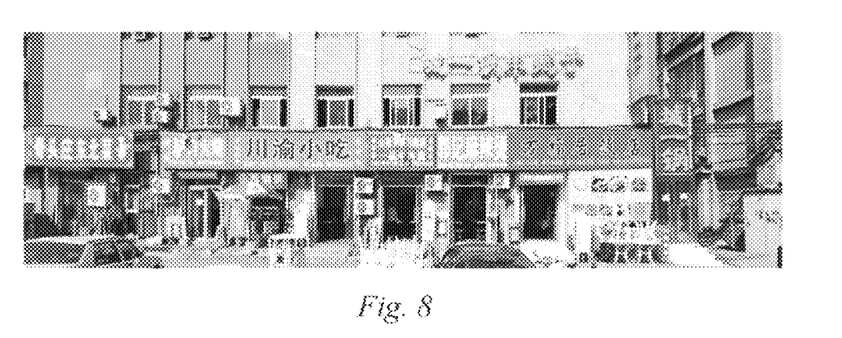
FIG. 8 is an image schematic diagram of a minimum recognition unit in an embodiment corresponding to FIG. 1.

Furthermore, in order to improve the accuracy of recognition processing, the recognition area to be recognized may specifically be split into blocks at a specified angular spacing, such as 90 degrees, and the images of adjacent blocks are 50% overlapped so as to acquire a specified number of blocks as a minimum recognition unit of recognition processing. Recognition processing may be specifically performed on each block respectively so as to acquire text information about each block. As shown in FIG. 8, the image shown in FIG. 8 is a minimum recognition unit, and the pixel size thereof is 1920×1080. For the image shown in FIG. 8, the recognition result may successively be "骨头庄东北菜 t", "家 tA| 川渝小、吃", "晒除刀加", "记麻辣 3" and "万福居改店".

Specifically, the degree of similarity between the text information and candidate points of interest to be matched may be specifically acquired, and then some candidate points of interest are selected as visible points of interest according to the degree of similarity.

The candidate point of interest to be matched refers to several points of interest nearby the collection site of the street view image to be processed. Specifically, according to the location of the collection site, the points of interest in an area with this location as the center and within a preset range may be specifically taken as the candidate points of interest to be matched.

For example, keywords of the text information are extracted and keywords of the candidate point of interest are extracted, and then the degree of similarity between the keywords of the text information and the keywords of the candidate point of interest is calculated. If the degree of similarity is greater than or equal to a preset threshold value, the corresponding candidate point of interest may be taken as a visible point of interest, otherwise, the corresponding candidate point of interest may be ignored, i.e., ruling out the possibility of taking the corresponding candidate point of interest as a visible point of interest.

In this embodiment, the candidate point of interest selected as a visible point of interest may be specifically marked so as to indicate that the candidate point of interest is a visible point of interest; this embodiment imposes no particular limitations in this respect. For example, a field, i.e., attribute information, is added to point of interest data of the candidate point of interest for indicating that the candidate point of interest is a visible point of interest. That is to say, the point of interest data of the visible point of interest may include but is not limited to name information about the point of interest, category information about the point of interest, and geographical location information and attribute information about the point of interest; this embodiment imposes no particular limitations in this respect.

Optionally, in a possible implementation of this embodiment, after 103, the geographical location information about the collection site of the street view image to which the text information matching the visible point of interest belongs may further be acquired, and an azimuth angle from the collection site of the street view image to which the text information matching the visible point of interest belongs to the visible point of interest is acquired. Thus, calculated geographical location information about the visible point of interest may be acquired according to the geographical location information about the collection site and the azimuth angle. Then, the visible point of interest may be verified according to the calculated geographical location information about the visible point of interest and standard geographical location information about the visible point of interest.

There is no fixed sequence for executing the step of "acquiring geographical location information about a collection site of a street view image to which the text information matching the visible point of interest belongs" and executing the step of "acquiring an azimuth angle from the collection site of the street view image to which the text information matching the visible point of interest belongs to the visible point of interest". The step of "acquiring geographical location information about a collection site of a street view image to which the text information matching the visible point of interest belongs" may be firstly executed and the step of "acquiring an azimuth angle from the collection site of the street view image to which the text information matching the visible point of interest belongs to the visible point of interest" is then executed, or the step of "acquiring geographical location information about a collection site of a street view image to which the text information matching the visible point of interest belongs" may be executed while the step of "acquiring an azimuth angle from the collection site of the street view image to which the text information matching the visible point of interest belongs to the visible point of interest" is executed, or the step of "acquiring an azimuth angle from the collection site of the street view image to which the text information matching the visible point of interest belongs to the visible point of interest" may be firstly executed and the step of "acquiring geographical location information about a collection site of a street view image to which the text information matching the visible point of interest belongs" is then executed; this embodiment imposes no particular limitations in this respect.

Specifically, the recognition result may further include pixel location information about the text information about the street view image apart from the text information about the street view image.

The pixel location information about the text information is used for indicating the location of an area range corresponding to the text information. Specifically, the pixel location information about the text information may be specifically represented with pixel coordinates of two vertices of a diagonal of the area corresponding to the text information, marked as [x1, y1, x2, y2], where [x1, y1] are the pixel coordinates of one vertex and [x2, y2] are the pixel coordinates of the other vertex. As shown in FIG. 8, the image shown in FIG. 8 is a minimum recognition unit, and the pixel size thereof is 1920×1080. For the image shown in FIG. 8, the recognition result may successively be " 骨头庄东北菜 t [12, 121, 117, 154]", "家 tAl 川渝小、 吃 [180, 121, 388, 153]", "晒除刀加 [423, 124, 474, 138]", "记麻辣 3 [505, 121, 567, 152]" and "万福居改店 [585, 123, 732, 158]".

It can be understood that, in the subsequent calculation process, if a calculation operation of the pixel location information about the text information is involved, the pixel coordinates of one location may be randomly selected within the area range corresponding to the text information for calculation, for example, the pixel coordinates of a central point.

Figure 4:
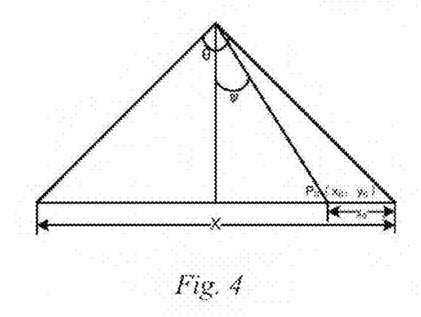
FIG. 4 is a calculation schematic diagram of an azimuth angle from a collection site of a street view image to which text information matching a visible point of interest belongs to the visible point of interest in an embodiment corresponding to FIG. 1.

Accordingly, as shown in FIG. 4, according to the pixel location information, i.e. $P_0(x_0, y_0)$, about the text information matching the visible point of interest, pixel information, i.e. X×Y, about the minimum recognition unit to which the text information belongs and a shooting angle range θ corresponding to the minimum recognition unit to which the text information belongs, an azimuth angle ψ from the collection site of the street view image to which the text information belongs to the visible point of interest may be specifically acquired. Reference may specifically be made to relevant content in the prior art for the detailed calculation process of the azimuth angle ψ, which will not be described here.

For example, if text information matching a visible point of interest P only belongs to one street view image A, calculated geographical location information about the visible point of interest P may be calculated according to geographical location information about a collection site A of the street view image A and an azimuth angle $\psi_A$ from the collection site A to the visible point of interest P, and geographical location information about the real road where the collection site A is located.

Alternatively, for another example, if the text information matching the visible point of interest P belongs to at least two street view images B and C, the calculated geographical location information about the visible point of interest P may be calculated according to geographical location information about a collection site B of the street view image B and an azimuth angle $\psi_B$ from the collection site B to the visible point of interest P, and geographical location information about a collection site C of the street view image C and an azimuth angle $\psi_C$ from the collection site C to the visible point of interest P.

Specifically, if the location difference value between the calculated geographical location information about the visible point of interest and the standard geographical location information about the visible point of interest is less than or equal to a preset threshold value, this indicates that the verification operation is successful, otherwise, this indicates that the verification operation has failed. The standard geographical location information about the visible point of interest refers to the geographical location information in the point of interest data of the visible point of interest stored in a POI database.

If the verification operation has failed, a plurality of adjustment operations may be specifically executed. For example, the standard geographical location information about the visible point of interest is replaced by the calculated geographical location information about the visible point of interest. Alternatively, for another example, this selection result of the visible point of interest is deleted, i.e. the visible point of interest is still taken as an ordinary candidate point of interest.

Optionally, in a possible implementation of this embodiment, in 103, the target point of interest may be specifically displayed by way of at least one of map labeling, an image and a text.

For example, the name information about the target point of interest may be specifically displayed to the user on an electronic map in a map labeling manner.

Alternatively, for another example, the street view image where the target point of interest is located may be specifically displayed to the user on an electronic map or other interface in an image manner.

Alternatively, for another example, the name information and description information about the target point of interest may be specifically displayed to the user on an electronic map or other interface in a text manner.

In this embodiment, by means of acquiring a location of a target object and then determining a visible point of interest at the location as a target point of interest, the target point of interest can be displayed. Since an invisible point of interest which cannot be seen at the location of the target object is no longer displayed, but a visible point of interest which can be seen at the location of the target object is displayed, the displayed point of interest can essentially satisfy the true locating intention of a user. Therefore, the problem in the prior art of the increase in data interaction between an application and a query engine caused by the user repeatedly querying via the application can be avoided, thereby reducing the processing burden of the query engine.

In addition, by using the technical solutions provided in the present invention, since an invisible point of interest which cannot be seen at the location of the target object is no longer displayed, but a visible point of interest which can be seen at the location of the target object is displayed, the displayed point of interest can essentially satisfy the true locating intention of the user and the validity of the locating result can be effectively improved.

In addition, by using the technical solutions provided in the present invention, since an invisible point of interest which cannot be seen at the location of the target object is no longer displayed, but a visible point of interest which can be seen at the location of the target object is displayed, the displayed point of interest can essentially satisfy the true locating intention of the user and the efficiency of location can be effectively improved.

It must be explained that, regarding the foregoing method embodiments, for the sake of simple description, the methods are described as a series of action combinations, but those of ordinary skill in the art shall know that the present invention is not limited to the action sequence described, because according to the present invention, some steps may be performed in other sequences or performed simultaneously. Secondly, those skilled in the art should also know that the embodiments described in the description are all preferred embodiments, and the actions and modules involved are not necessarily required in the present invention.

In the embodiments above, the description of each embodiment has its own emphasis, and for a part a certain embodiment that is not detailed, reference can be made to the relevant description of other embodiments.

Figure 5:
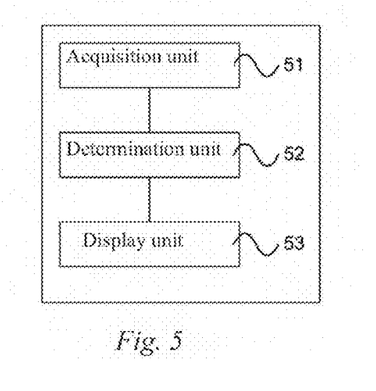
FIG. 5 is a structural schematic diagram of an apparatus for displaying a point of interest provided in another embodiment of the present invention.

FIG. 5 is a structural schematic diagram of an apparatus for displaying a point of interest provided in another embodiment of the present invention, as shown in FIG. 5. The apparatus for displaying a point of interest in this embodiment may comprise an acquisition unit 51, a determination unit 52 and a display unit 53. The acquisition unit 51 is used for acquiring a location of a target object; the determination unit 52 is used for determining a visible point of interest at the location as a target point of interest; and the display unit 53 is used for displaying the target point of interest.

It must be explained that the apparatus for displaying a point of interest provided in this embodiment may be an application located in a local terminal, or may also be a functional unit such as a plug-in or a software development kit (SDK) arranged in the application located in the local terminal, or may also be a query engine located in a network-side server; this embodiment imposes no particular limitations in this respect.

It can be understood that the application may be an application program (nativeAPP) installed on a terminal, or may also be a webpage program (webAPP) of a browser on the terminal; this embodiment imposes no limitations in this respect.

Figure 6:
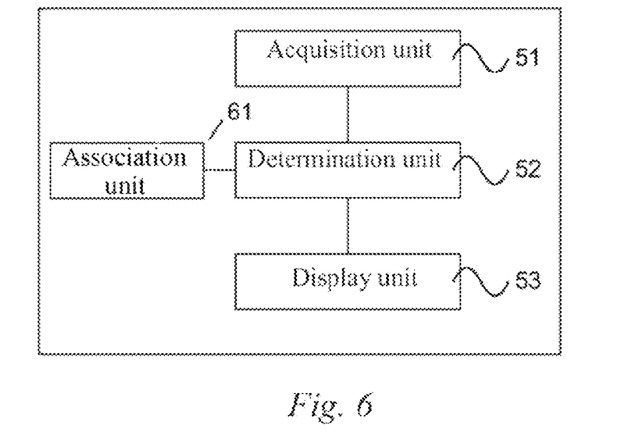
FIG. 6 is a structural schematic diagram of an apparatus for displaying a point of interest provided in another embodiment of the present invention.

Optionally, in a possible implementation of this embodiment, as shown in FIG. 6, the apparatus for displaying a point of interest provided in this embodiment may further comprise an association unit 61 for acquiring a street view image to be processed, performing recognition processing on the street view image to acquire a recognition result, with the recognition result comprising text information about the street view image, and selecting a candidate point of interest matching the text information as a visible point of interest.

Specifically, the association unit 61 may be specifically used for acquiring the degree of similarity between the text information and candidate points of interest to be matched, and selecting some candidate points of interest as visible points of interest according to the degree of similarity.

Figure 7:
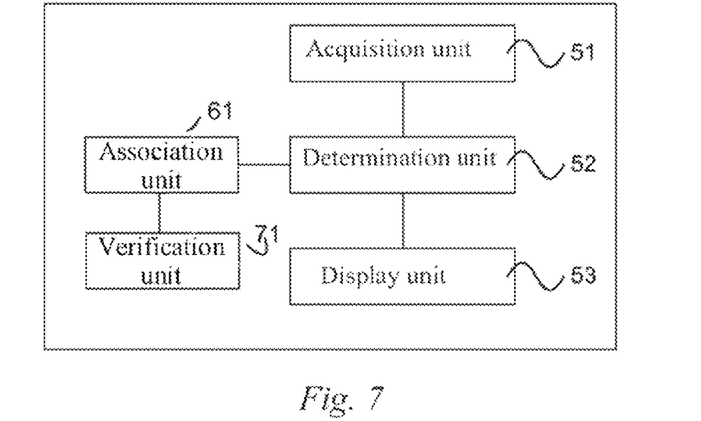
FIG. 7 is a structural schematic diagram of an apparatus for displaying a point of interest provided in another embodiment of the present invention.

Furthermore, as shown in FIG. 7, the apparatus for displaying a point of interest provided in this embodiment may further comprise a verification unit 71 for acquiring geographical location information about a collection site of a street view image to which the text information matching the visible point of interest belongs, acquiring an azimuth angle from the collection site of the street view image to which the text information matching the visible point of interest belongs to the visible point of interest, acquiring calculated geographical location information about the visible point of interest according to the geographical location information about the collection site and the azimuth angle, and verifying the visible point of interest according to the calculated geographical location information about the visible point of interest and standard geographical location information about the visible point of interest.

Optionally, in a possible implementation of this embodiment, the display unit 53 may be specifically used for displaying the target point of interest by way of at least one of map labeling, an image and text; this embodiment imposes no particular limitations in this respect.

It must be explained that the method in the embodiment corresponding to FIG. 1 may be realized by the apparatus for displaying a point of interest provided in this embodiment. Reference may be made to relevant contents in the embodiment corresponding to FIG. 1 for a detailed description, which will not be repeated here.

In this embodiment, by means of an acquisition unit acquiring a location of a target object and then a determination unit determining a visible point of interest at the location as a target point of interest, a display unit can display the target point of interest. Since an invisible point of interest which cannot be seen at the location of the target object is no longer displayed, but a visible point of interest which can be seen at the location of the target object is displayed, the displayed point of interest can essentially satisfy the true locating intention of a user. Therefore, the problem in the prior art of the increase in data interaction between an application and a query engine caused by the user repeatedly querying via the application can be avoided, thereby reducing the processing burden of the query engine.

In addition, by using the technical solutions provided in the present invention, since an invisible point of interest which cannot be seen at the location of the target object is no longer displayed, but a visible point of interest which can be seen at the location of the target object is displayed, the displayed point of interest can essentially satisfy the true locating intention of the user and the validity of the locating result can be effectively improved.

In addition, by using the technical solutions provided in the present invention, since an invisible point of interest which cannot be seen at the location of the target object is no longer displayed, but a visible point of interest which can be seen at the location of the target object is displayed, the displayed point of interest can essentially satisfy the true locating intention of the user and the efficiency of location can be effectively improved.

Those of ordinary skill in the art may clearly understand that, for convenience and brevity of description, information about the specific operation processes of the above-described systems, apparatuses, and units may be found by referring to the corresponding processes in the method embodiments above, which will not be described here.

In a few embodiments provided in the present invention, it shall be understood that the disclosed system, apparatus and method may be implemented in other ways. For example, the apparatus embodiments described above are merely illustrative, for example, the division of the units is merely a logical function division, and there may be other forms of division in actual implementation, for example, a plurality of units or components may be combined or may be integrated into another system, or some features may be omitted, or not carried out. Another point is that a coupling or direct coupling or communication connection shown or discussed may be an indirect coupling or a communication connection via interfaces, apparatuses, or units, and may be electrical, mechanical, or in other forms.

The units described as separate components may or may not be physically separated, and components displayed as units may or may not be physical units, that is, may be located in one position, or may also be distributed on a plurality of network elements. Some or all of the units may be selected according to actual needs to achieve the objectives of the solutions of the present embodiments.

In addition, various functional units in various embodiments of the present invention may be integrated into one processing unit, or each of the units may also exist alone physically, or two or more units may be integrated into one unit. The integrated unit above may be implemented in the form of hardware or may also be implemented in the form of hardware with software functional units.

The integrated unit above implemented in the form of software functional units may be stored in a computer readable storage medium. The software functional units are stored in a storage medium and include several instructions for making a computer device (which can be a personal computer, a server, or a network device and so on) or a processor execute some steps of the method described in the embodiments of the present invention. The foregoing storage medium comprises: various media that can store program code, such as a USB stick, a removable hard disk, a read-only memory (ROM), a random access memory (RAM), a magnetic disk, or an optical disk.

Finally, it should be explained that the embodiments above are merely used for illustrating the technical solutions of the present invention rather than limiting same; although the present invention is described in detail with reference to the foregoing embodiments, those of ordinary skill in the art shall understand that they may still make modifications to the technical solutions stated in the various foregoing embodiments or make equivalent replacements of some technical features thereof; and these modifications or replacements shall not result in the essence of the corresponding technical solutions departing from the spirit and scope of the technical solutions of various embodiments of the present invention.

What is claimed is:

1. A method for displaying a point of interest, comprising:
    acquiring a location of a target object;
    performing recognition processing on a street view image acquired at the location, to recognize text information arranged at a selected height from a road surface in the street view image;
    selecting a candidate point of interest from a point-of-interest (POI) database upon determining that the candidate point of interest matches the text information;
    marking the candidate point of interest in the POI database as a visible point of interest at the location;
    acquiring calculated geographical location information about the visible point of interest according to geographical location information about a collection site of the street view image and an azimuth angle from the collection site to the visible point of interest;
    verifying the visible point of interest according to the calculated geographical location information and standard geographical location information about the visible point of interest;
    replacing the standard geographical location information about the visible point of interest by the calculated geographical location information about the visible point of interest upon failure of said verifying;
    determining the visible point of interest at the location as a target point of interest; and
    displaying the target point of interest on an electronic map.

2. The method of claim 1, wherein said performing the recognition processing and said selecting the candidate point of interest each occur prior to said determining the visible point of interest.

3. The method of claim 1, wherein said selecting the candidate point of interest includes:
    acquiring a degree of similarity between the text information and candidate points of interest to be matched; and
    selecting at least one of the candidate points of interest as visible points of interest according to the degree of similarity.

4. The method of claim 1, further comprising:
    acquiring the geographical location information about the collection site of the street view image to which the text information matching the visible point of interest belongs; and
    acquiring the azimuth angle from the collection site to the visible point of interest based on the street view image.

5. The method of claim 4, wherein said acquiring the geographical location information, said acquiring the azimuth angle, said acquiring the calculated geographical location information and said verifying the visible point of interest each occur after said selecting the candidate point of interest.

6. The method of claim 1, wherein said displaying the target point of interest comprises displaying the target point of interest via at least one of map labeling, an image and text.

7. The method of claim 4, wherein:
    said verifying is successful when a location difference value between the calculated geographical location information about the visible point of interest and the standard geographical location information about the visible point of interest is less than or equal to a preset threshold value; and
    said verifying fails when the location difference value is greater than the preset threshold value.

8. An apparatus for displaying a point of interest, comprising:
    a processor;
    a display unit coupled to said processor; and
    a memory having one or more programs stored thereon, the programs, when executed by said processor, instruct said processor to:
    acquire a location of a target object;
    perform recognition processing on a street view image acquired at the location, to recognize text information arranged at a selected height from a road surface in the street view image;
    select a candidate point of interest from a point-of-interest (POI) database upon determining that the candidate point of interest matches the text information;
    mark the candidate point of interest in the POI database as a visible point of interest at the location;

acquire calculated geographical location information about the visible point of interest according to geographical location information about a collection site of the street view image and an azimuth angle from the collection site to the visible point of interest;

verify the visible point of interest according to the calculated geographical location information and standard geographical location information about the visible point of interest;

replace the standard geographical location information about the visible point of interest by the calculated geographical location information about the visible point of interest upon failure of verifying the visible point of interest;

determine the visible point of interest at the location as a target point of interest; and display the target point of interest on an electronic map via said display unit.

9. The apparatus of claim 8, wherein the programs instruct said processor to perform the recognition processing and select the candidate point of interest before determining the visible point of interest.

10. The apparatus of claim 8, wherein the programs instruct said processor acquire a degree of similarity between the text information and candidate points of interest to be matched and select at least one of the candidate points of interest as visible points of interest according to the degree of similarity.

11. The apparatus of claim 8, wherein the programs instruct said processor to acquire the geographical location information about the collection site of the street view image to which the text information matching the visible point of interest belongs, and to acquire the azimuth angle from the collection site to the visible point of interest based on the street view image.

12. The apparatus of claim 11, wherein the programs instruct said processor to acquire the geographical location information, acquire the azimuth angle, acquire the calculated geographical location information and verify the visible point of interest after selecting the candidate point of interest.

13. The apparatus of claim 8, wherein the programs instruct said processor to display the target point of interest via at least one of map labeling, an image and text.

14. A non-transitory computer storage medium including at least one program for displaying a point of interest when implemented by a processor, comprising:

instruction for acquiring a location of a target object;

instruction for performing recognition processing on a street view image acquired at the location, to recognize text information arranged at a selected height from a road surface in the street view image;

instruction for selecting a candidate point of interest from a point-of-interest (POI) database upon determining that the candidate point of interest matches the text information;

instruction for marking the candidate point of interest in the POI database as a visible point of interest at the location;

instruction for acquiring calculated geographical location information about the visible point of interest according to geographical location information about a collection site of the street view image and an azimuth angle from the collection site to the visible point of interest;

instruction for verifying the visible point of interest according to the calculated geographical location information and standard geographical location information about the visible point of interest;

instruction for replacing the standard geographical location information about the visible point of interest by the calculated geographical location information about the visible point of interest upon failure of said verifying;

instruction for determining the visible point of interest at the location as a target point of interest; and instruction for displaying the target point of interest on an electronic map.

15. The computer storage medium of claim 14, wherein said instruction for performing the recognition processing and said instruction for selecting the candidate point of interest each are executed prior to execution of said instruction for determining the visible point of interest.

16. The computer storage medium of claim 14, wherein said instruction for selecting the candidate point of interest includes:

instruction for acquiring a degree of similarity between the text information and candidate points of interest to be matched; and instruction for selecting at least one of the candidate points of interest as visible points of interest according to the degree of similarity.

17. The computer storage medium of claim 14, further comprising:

instruction for acquiring the geographical location information about the collection site of the street view image to which the text information matching the visible point of interest belongs; and instruction for acquiring the azimuth angle from the collection site to the visible point of interest based on the street view image.

18. The computer storage medium of claim 14, wherein said instruction for displaying the target point of interest comprises instruction for displaying the target point of interest via at least one of map labeling, an image and text.

* * * * *